US010216423B1

United States Patent
Malwankar et al.

(10) Patent No.: US 10,216,423 B1
(45) Date of Patent: Feb. 26, 2019

(54) STREAMS ACROSS MULTIPLE CONTROLLERS TO IMPROVE SOLID STATE DRIVE PERFORMANCE

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Sundar Kanthadai, Fremont, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 0 days.

(21) Appl. No.: 15/706,513

(22) Filed: Sep. 15, 2017

Related U.S. Application Data

(60) Provisional application No. 62/395,678, filed on Sep. 16, 2016.

(51) Int. Cl.
*G06F 3/06* (2006.01)
*G06F 12/02* (2006.01)
*G06F 12/10* (2016.01)

(52) U.S. Cl.
CPC .............. *G06F 3/061* (2013.01); *G06F 3/064* (2013.01); *G06F 3/0617* (2013.01); *G06F 3/0688* (2013.01); *G06F 12/0292* (2013.01); *G06F 12/10* (2013.01); *G06F 2212/1016* (2013.01); *G06F 2212/2022* (2013.01); *G06F 2212/222* (2013.01); *G06F 2212/72* (2013.01)

(58) Field of Classification Search
CPC ........ G06F 3/061; G06F 3/064; G06F 3/0688; G06F 12/0238; G06F 12/0246; G06F 12/0292; G06F 12/10; G06F 12/1018; G06F 12/1036; G06F 12/1072; G06F 12/1081; G06F 2212/1016; G06F 2212/2022; G06F 2212/222
See application file for complete search history.

(56) References Cited

U.S. PATENT DOCUMENTS

| 2014/0351527 A1* | 11/2014 | Traut | G06F 3/061 711/154 |
| 2015/0142976 A1* | 5/2015 | Farasat | H04L 47/70 709/226 |
| 2018/0059988 A1* | 3/2018 | Shivanand | G06F 3/0604 |

* cited by examiner

*Primary Examiner* — Glenn A. Auve
(74) *Attorney, Agent, or Firm* — Lowenstein Sandler LLP

(57) ABSTRACT

A processing device of a storage server that manages a plurality of SSDs receives a request to write data. The processing device determines one or more attributes associated with the request, generates a stream tag for the request based on the one or more attributes, and sends a first write command to a first SSD of the plurality of SSDs. The first write command comprises at least a portion of the data and the stream tag that causes the first SSD to write the portion of the data to a first stream block of the first SSD.

20 Claims, 8 Drawing Sheets

STREAMS ACROSS MULTIPLE CONTROLLERS TO IMPROVE SOLID STATE DRIVE PERFORMANCE

RELATED APPLICATIONS

The present application claims the benefit of U.S. Provisional Patent Application No. 62/395,678 filed Sep. 16, 2016, which is incorporated by reference herein.

FIELD OF TECHNOLOGY

This disclosure relates generally to the field of data storage and in particular to data streams for solid state storage devices.

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. However, SSDs typically follow log-structured writing where incoming write commands are applied to open pages within a block of the SSD in their order of arrival. When a logical address is overwritten with new data, the original data at that logical address becomes stale. A given block may contain a series of pages that are stale and others that are still valid. Periodically, SSDs can consolidate pages by performing erase operations or garbage collection on these blocks to make the entire block available for new writes. This process can prevent access to multiple blocks on the SSD for a significant period of time, increasing latency for subsequent read requests for valid pages on these blocks.

BRIEF DESCRIPTION OF THE DRAWINGS

The embodiments described herein will be understood more fully from the detailed description given below and from the accompanying drawings.

DETAILED DESCRIPTION

Figure 1:
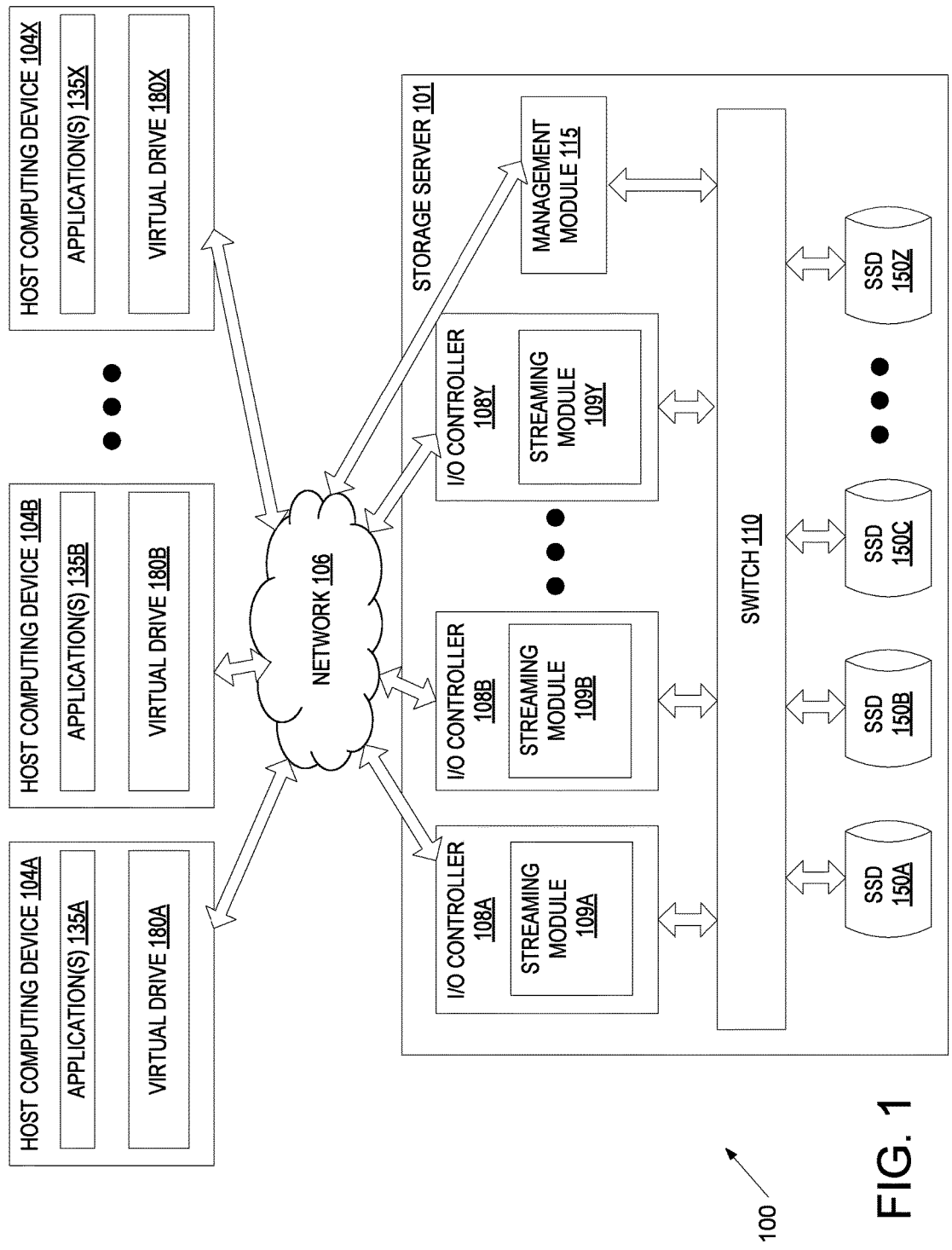
FIG. 1 is a block diagram example of a network architecture, in which embodiments described herein may operate.

Described herein are systems and methods that enable and implement streams across multiple controllers to improve solid state drive performance. Solid state drives (SSDs) can provide low latency for read requests in many situations. However, repeated writing and re-writing of data to SSDs typically involves occasionally reclaiming blocks that are discarded as a part of the SSD log structure. This process can involve the performance of erase operations or "garbage collection" operations. Subsequent reads of a block of an SSD that is being accessed by a background operation process may incur an exponentially higher latency (often orders of magnitude higher) than would otherwise be observed by a normal read request.

Streaming data to SSDs has been used to mitigate the high latency associated with such read requests made to blocks that are undergoing erasure and to minimize an amount of data that is moved during a garbage collection operation. An application can insert a "tag" into a write command and create an affiliation for a group of writes that possess a similar lifespan. This tag can be used to direct the writes to a particular block of an SSD such that at the time of erasing that block, all page entries in that block (or at the least an increased percentage of the block) should be invalid at a particular time during which the application should not need any of the data. Thus, the performance of erase operations may be substantially improved since no pages within the block should need to be moved.

Streaming, however, typically involves individual applications inserting tags into writes initiated by the application, where the data from the writes have similar lifespans. However, an application may be executing on a client device that is remote from the SSDs onto which data will be stored, and the application may be unaware of the capabilities of SSDs in the storage array. Moreover, if multiple applications communicating with the same storage array elect to submit tags with their associated write requests, the total number of unique tags submitted to the array may exceed the number of active streams that may be supported by the SSDs in the storage array. This can be further complicated by multiple clients connecting to the storage array, each with multiple applications submitting write requests.

Embodiments described herein provide a streaming module component of a storage server I/O controller that can manage streams across multiple controllers in a storage array to improve SSD performance. The streaming module can assume responsibility for managing data streaming, and in relieving individual applications from do so can more efficiently manage the streaming process across a storage array. The streaming module can act as a funnel for all write requests received by the I/O controller, and assign stream tags according to the characteristics of the storage array known to the I/O controller. Since the I/O controller can be made aware of the capabilities of the SSDs of the storage array, embodiments described herein can provide the benefits of data streams across multiple controllers receiving requests from multiple applications. Moreover, the I/O controller can generate an assigned number of unique tags, where each unique tag is used for a separate stream.

In embodiments, the I/O controller may receive a request from a requestor such as a remote computing device (e.g., a remote server) to write data to a first logical address of a virtual storage device that is mapped to SSDs on a storage server. The I/O controller may determine attribute values of one or more attributes associated with the request. The I/O controller may then generate a stream tag for the request based on the attribute values of the one or more attributes associated with the request. The I/O controller may then send a write command to one of the SSDs on the storage server, where the write command includes a portion of the data to be written to the logical address and the stream tag. The stream tag can cause the SSD to write the portion of the data to a block of the SSD that is reserved for the stream associated with the tag included with the write command.

In further embodiments, a management controller of the storage server determines a number of active streams supported by an SSD on the storage server. The management controller then identifies the I/O controllers of the storage server and divides the number of active streams between the I/O controllers. The management controller then notifies each I/O controller of a subset of the number of active streams that is assigned to that I/O controller.

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X, also referred to herein as client computing devices). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A-X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C through 150Z of storage server 101). Additionally, a virtual drive 180A-X may map a logical storage address space to physical storage address spaces of storage devices on multiple different storage servers.

When a host computing device 104A-X connects to one of I/O controllers 109A-Y, the host computing device 104A-X and I/O controller 108A-Y establish a remote direct memory access (RDMA) queue pair that includes an RDMA send queue and an RDMA receive queue. This includes establishing an area of a memory of the host computing device 104A-X that the corresponding I/O controller 109A-Y can access using RDMA and establishing an area of memory of I/O controller 109A-Y that host computing device 104A-X can access using RDMA.

When an application 135A-X running on host computing device 104A-X issues a save command, host computing device 104A-X generates a write request. Generation of the write request may include generating a work request element (WQE) in the RDMA send queue. The WQE may include a pointer to a location in memory where the data to be written is stored, a pointer to a location in memory where the data is to be written, and a host LBA of the virtual drive 180A-X to which the data is to be written.

Storage server 101 includes multiple I/O controllers 108A, 108B through 108Y connected to multiple solid state drives (SSDs) 150A, 150B, 150C through 150Z via a switch 110. The SSDs 150A-Z may be SAS/SATA drives, non-volatile memory express (NVMe) drives, small computer system interface (SCSI) over PCIe (SOP) drives, or solid state drives that communicate using different protocols. The number of SSDs included in storage server 101 may be less than 10 to more than 100. The solid state drives may have the same or different storage capacities. In some implementations, the number of host computing devices 104A-X, the number of I/O controllers 108A-Y, and the number of SSDs 150A-Z may be different from each other.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. Though only a single switch 110 is shown, the I/O controllers 108A-Y may include multiple ports for connecting to multiple different switches and associated fabrics.

In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to (e.g., that has been presented to the host computing device 104A-X). Responsive to such a read or write request, the host computing device 104A-X sends a host command to the I/O controller 208A-X that is assigned to that host computing device 204A-X to initiate the read or write operation. As used herein, a host command is a read or write command that originates at a host computing device.

When the I/O controller 108A-Y receives a read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. For example, if a read command is received, the I/O controller 108A-Y may determine which SSDs 150A-Z store the information to be read as well as which physical addresses on those SSDs the data should be read from.

The I/O controller 108A-Y may then generate one or more sub-commands directed to the determined SSDs 150A-Z to write data to those SSDs or read data from those SSDs 150A-Z. The I/O controller 108A-Y may additionally allocate buffer space for each of the sub-commands in a memory of the I/O controller 108A-Y. Once all sub-commands associated with a read command have been received from the applicable SSDs 150A-Z, I/O controller 108A-Y may then combine the data of each of the sub-commands that was stored in the buffer space and return the combined data as a response to the read command received from host computing device.

I/O controllers 108A-Y may additionally include array configuration information for the SSDs 150A-Z that may be used to reconstruct data of one or more virtual drives 180A-X if one or more of the SSDs 150A-Z becomes unavailable. The SSDs 150A-Z may become unavailable due to a drive failure, performance degradation due to execution of a background operation (e.g., an erasure operation, storage reclamation processing such as garbage collection, etc.), or the like.

Switch 110 is a multi-port bridge that connects I/O controllers 108A-Y to SSDs 150A-Z. Switch 110 manages the flow of data within storage server 101 by connecting specific I/O controllers 108A-Y to specific SSDs 150A-Z on a message by message basis, allowing the switch 110 to regulate the flow of traffic. Each I/O controller 108A-Y and each SSD 150A-Z connected to switch 110 can be identified using a unique address (e.g., a unique port address) of the I/O controller or SSD. Switch 110 may be a PCIe switch, an Ethernet switch, a SAS or SATA expander, a USB switch, or other type of switch.

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives. SSDs are more resilient, consume less power, and have lower latency (access times). In one embodiment, SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. SSDs 150A-Z may include one or more ports (e.g., PCIe ports) to connect to switch 110. SSDs 150A-Z may connect to switch 110 via PCIe, SCSI, SAS. USB, or other connection protocols.

Each SSD 150A-Z has a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, SSDs 150A-Z may have pages that are 4 kilobytes (kB), 8 kB, or 16 kB. However, other page sizes are also possible. SSD pages are grouped into blocks. Each block contains a particular number of pages, which is again dependent on a design of a particular SSD. Typical SSDs have blocks that include 256 pages. Notably, conventionally an SSD may only perform a write or a read to a single page in a block at a time.

For SSDs such as Flash SSDs, to write over the contents of a memory page, that memory page must first be erased. However, SSDs such as Flash SSDs have asymmetric write and erase capabilities. In particular, for Flash memory devices reads and writes are performed on individual memory pages. However, erase operations are not performed on individual memory pages. Instead, erase operations are performed on entire blocks. Accordingly, rather than re-writing over a given memory page when contents of that memory page are changed, that specific memory page is marked as invalid and the changed data is written to a new memory page.

In order to reuse the invalid memory pages, the SSDs 150A-Z occasionally perform erasure operations or garbage collection. To perform garbage collection, an SSD may enter into a garbage collection mode and perform one or more garbage collection operations. Garbage collection operations may include first determining which blocks have a number of invalid memory pages that exceeds a threshold. For such blocks that have numerous invalid memory pages, the contents of valid memory pages from the blocks are copied to memory pages in other blocks. Once this is completed, all of the memory pages in those blocks having the numerous invalid memory pages are erased. The memory pages in those blocks may then be written to again.

For solid state storage devices such as Flash SSDs, erase operations typically take significantly more time to complete than either read or write operations. For example, for current Flash SSDs read operations are typically completed in tens to hundreds of microseconds (e.g., about 50-90 microseconds) and write operations are typically completed in about 1-2 milliseconds (ms). However, erase operations are typically performed in around 10 milliseconds. As a result, garbage collection operations are typically completed in a time frame that is significantly greater than the time frame for read and write operations. If a read or write operation is requested while one or more SSDs 150A-Z are in garbage collection mode, a requestor typically waits until the garbage collection is complete before the read or write command is satisfied. This can introduce significant lag. Embodiments described herein minimize such lag through the use of streams for writing data to an array of SSDs, as discussed in detail below.

As noted above, a stream can represent a set of data writes from one or more requestors that are associated with each other (e.g., are from the same application, host, client, etc.) or have the same approximate life expectancy (e.g., the data written remains valid for approximately the same amount of time). Streams may be implemented by determining tag values and associating tags having those tag values with the write commands when they are sent to one of the SSDs 150A-Z. The destination SSD may then store the data of the write to a particular block of the SSD that is reserved for data with that tag. Since write commands with the same tag should have a similar life expectancy, the data stored within a block reserved for that tag should remain valid for a similar amount of time. Thus, when the block becomes eligible for erasure or garbage collection, there should not be any pages within the block that need to be moved, or should be a minimal number of such pages.

Each I/O controller 108A-Y may include a streaming module 109A-Y that manages data streams for write commands to achieve the reduced latency for garbage collection as described above. Upon receiving a request to write data to a logical address of a virtual storage device that is mapped to SSDs 150A-Z, I/O controller 108A-Y may invoke streaming module 109A-Y to determine a stream to which to assign the write prior to sending to one of SSDs 150A-Z. The request may be received from a requestor, which may be one of applications 135A-X on host computing devices 104A-X.

To generate a stream tag, streaming module 109A-Y may first determine attribute values for one or more attributes associated with the write request. In some implementations, the attributes can include at least one of a client identifier, an application identifier, a remote direct memory access (RDMA) queue pair identifier, or a logical unit number (LUN) associated with the virtual storage device (e.g., virtual drives 180A-X). Streaming module 109A-Y may select the attributes to use for the stream tag based on system configuration information, or alternatively, may receive the attributes to use for the stream tag from management module 115 as described above.

Streaming module 109A-Y may then generate a stream tag for the write request based on the attribute values of the one or more attributes associated with the request. In some implementations, streaming module 109A-Y may generate the stream tag using a hashing function. A hashing function is a function that can be used to map data to a fixed size. Values returned from a hashing function may be referred to as hash values, hash codes, hash sums, hashes, etc. The hashing function may be received from management module 115 with the list of attributes to be used with the hashing function as described above. Streaming module 109A-Y may generate a hash value based on the attribute values of the one or more attributes, where the hash value is the stream tag for the write request. The hashing function of streaming module 109A-Y is described in further detail below with respect to FIG. 2A.

Once the stream tag has been generated for the write request, streaming module 109A-Y may then send a write command to one SSDs 150A-Z. The write command may include a portion of the data to be written as well as the stream tag. The stream tag, once received by the destination SSD 150A-Z, can cause the destination SSD 150A-Z to write the portion of the data to a block of that SSD that is reserved for data with that particular stream tag. In some implementations, the write request from the host computing device may cause multiple write sub-commands to be generated, each with a different portion of the data to be written, but each with the same stream tag. Each write sub-command may be directed to a different SSD of SSDs 150A-Z, but can still include the same stream tag. Subsequent write requests from different requestors (e.g., different applications 135A-X) can result in different stream tags, which in turn can result in the data being written to different blocks of one of SSDs 150A-Z. I/O controller 109A-Y is described in further detail below with respect to FIG. 2A.

Storage server 101 additionally includes a management module 115. Management module 115 may be a device configured to perform particular operations with regards to management of the array of SSDs 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of SSDs 150A-Z and further determines configurations for the one or more virtual drives 180A-X. For example, management module 115 may determine which virtual drives 180A-X map to which physical SSDs and which portions of those SSDs the virtual drives map to. Once these configurations are determined, management module 115 may send these configurations to the I/O controllers 108A-Y for implementation. Management module 115 additionally performs discovery operations and may be responsible for paring I/O controllers 108A-Y with host computing devices 104A-X. Discovery operations may be initiated when storage server 101 powers on and/or to connect host computing devices to new or updated virtual drives.

The management module 115 may additionally manage stream configuration for the storage array. Management module 115 may determine the number of streams that may be supported by each of the SSDs 150A-Z in storage server 101, and apportion the streams to each of the I/O controllers 108A-Y. In some implementations, management module 115 may determine a number of active streams supported by each of the SSDs 150A-Z, identify each of the I/O controllers 108A-Y in storage server 101, then divide the number of active streams between the plurality of I/O controllers. In one embodiment, management module 115 may divide the streams evenly between the I/O controllers 108A-Y. Alternatively, management module 115 may allocate the streams unevenly. For example, management module 115 may allot more streams to those I/O controllers that are expected to handle a greater portion of the writes received from host computing devices 104A-X, and fewer streams to the other I/O controllers. Management module may then notify each of the I/O controllers 108A-Y of a subset of the number of active streams that is assigned to that I/O controller.

The management module 115 may additionally notify the I/O controllers 108A-Y of information that the I/O controllers may use to generate tags for their assigned streams. In some implementations, management module 115 may identify a set of attributes that may be used to generate the stream tags. For example, management module 115 may collect information for each of the host computing devices 104A-X such as client identifiers, application identifiers, logical unit numbers (LUNS) associated with virtual drives 180A-X, Remote Direct Memory Access queue pair (RDMA) identifiers, or any similar information. Management module 215 may also determine a hashing function that the I/O controllers may use to generate unique hash values for the stream tags based on the values for the set of attributes. The hashing function and attributes may then be sent to each of the I/O controllers to generate their respective stream tag values. Management module 115 is described in further detail below with respect to FIG. 2B.

Figure 2A:
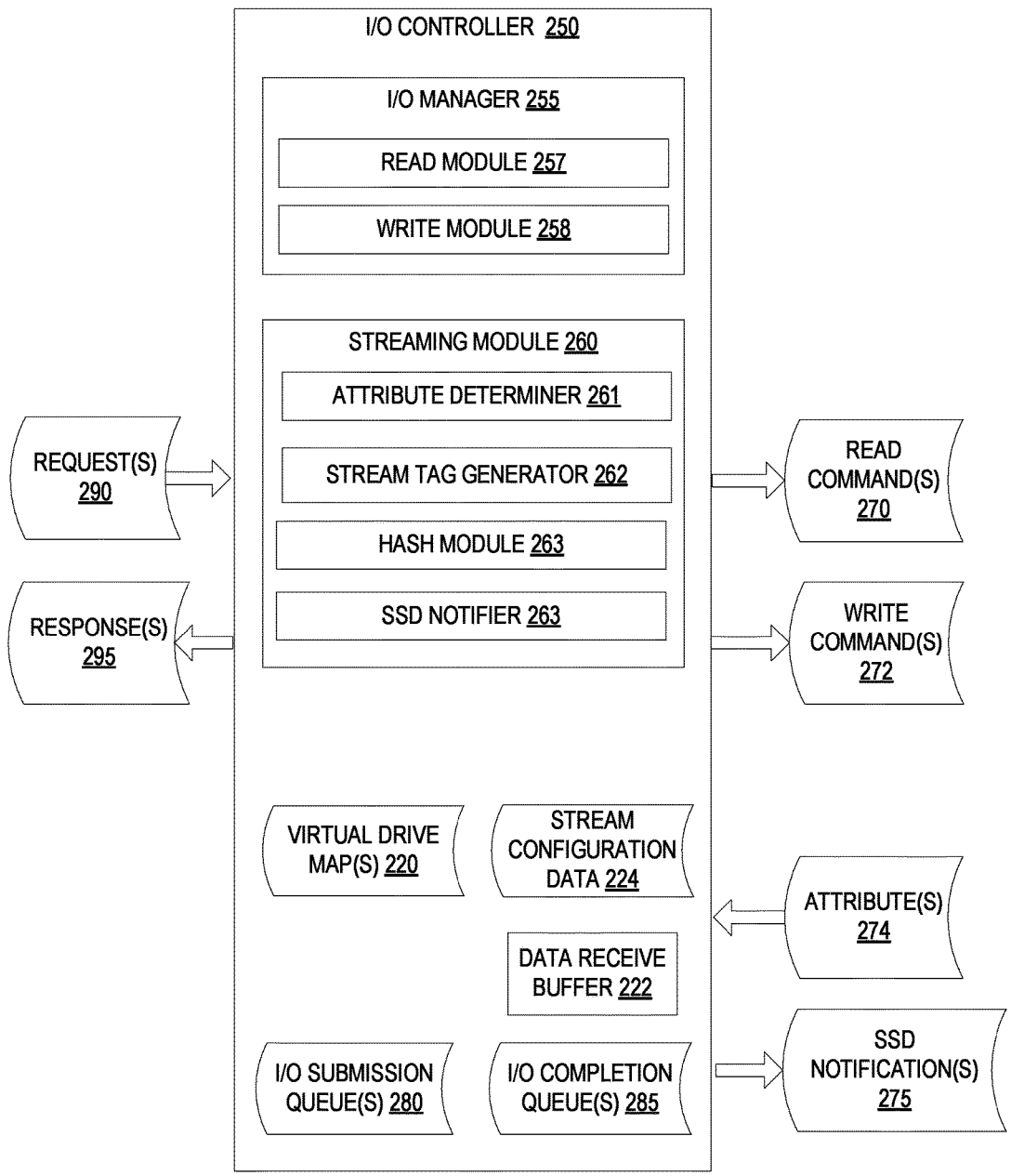
FIG. 2A is a block diagram of one embodiment of an I/O controller.

FIG. 2A is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255. The I/O manager 255 in one embodiment includes a read module 257 and a write module 258. Alternatively, the read module 257 and/or write module 258 may be distinct modules that are separate from I/O manager 255.

I/O manager 255 is responsible for communicating with host computing devices and satisfying input/output (I/O) commands such as read commands and write commands from the host computing devices. I/O controller 250 receives requests 290 from host computing devices. The requests 290 may be, for example, messages encapsulated as Ethernet packets. The received requests 290 may contain I/O commands and/or data. Responsive to receipt of a request 290 from a host, I/O manager 255 may remove an I/O command and/or data from the request and/or determine which module 257-258 should handle the data or I/O command.

Responsive to receipt of a read command, I/O manager 255 invokes read module 257. Read module 257 is responsible for responding to read commands. In one embodiment, the command payload of the read command identifies specific logical block addresses of a virtual storage device (e.g., a virtual NVMe drive) from which data is to be read. For example, the command payload may identify a particular logical block address and a length. Read module 257 may use virtual drive map 220 for the virtual drive to determine what locations (e.g., what SSD pages) on the SSDs correspond to the logical block addresses of the virtual drive.

Read module 257 may then generate read commands 270 for each of the storage devices storing data to be read. For example, if a virtual drive maps to three physical drives, read module 257 may determine first memory pages on a first drive storing requested information, second memory pages on a second drive storing requested information and third memory pages on a third drive storing requested information. Read module 257 may then generate a first read command directed to the first memory pages of the first drive, a second read command directed to the second memory pages of the second drive, and a third read command directed to the third memory pages of the third drive. The read commands may be placed into I/O submission queues 280 for each of the drives that are managed by the I/O manager. Once a read command reaches the front of an I/O submission queue 280, read module 257 may then send the generated read command to the appropriate drive.

Responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may use the virtual drive map 220 for the virtual drive to determine what locations (e.g., what memory pages) on the physical storage devices (e.g., physical NVMe drives) correspond to the logical block addresses of the virtual drive. Alternatively, the logical block addresses (e.g., a starting logical block address and length) may be indicated in the write command.

Following the request (e.g., Ethernet packet) encapsulating the write command, I/O controller 250 may receive additional requests identifying the particular write command and encapsulating data to be written that is associated with the write command. Since Ethernet packets have a dictated maximum size, the data to be written may be broken up into portions, where each portion can be encapsulated within a separate Ethernet packet. I/O manager 255 may remove the data from each such request (e.g., from each Ethernet packet) and provide the data to write module 258. Write module 258 may add the received data extracted from the Ethernet packets (or other messages) into a data receive buffer 222.

Write module 258 may then generate write commands 272 for each of the storage devices to which the data will be written. The write commands 272 may be placed into I/O submission queues 280 for each of the drives that are managed by the I/O manager. Once a write sub-request reaches the front of an I/O submission queue 280, write module 258 may then send the generated write command to the appropriate drive.

The drives receive the write commands and write the data portions to the specified locations. The drives then return a completion notification. These completion notifications may be added to the I/O completion queue 285. Once completion notifications have been received from each of the drives to which data was written (and in some embodiments these completion notifications reach a front of the I/O completion queue), write module 258 may generate a response 295 (e.g., a new Ethernet packet having the above identified format). Write module 258 may then encapsulate the completion notification into the response 295. Write module 258 may then send the response 295 to the host.

I/O controller 250 may additionally include streaming module 260 that can improve SSD performance by assigning stream tags to write requests prior to sending write commands to the SSDs. In one embodiment, streaming module 260 is a component of write module 258. In some implementations, streaming module 260 may include an attribute determiner 261, a stream tag generator 262, a hash module 263, and an SSD notifier 263. Alternatively, the attribute determiner 261, stream tag generator 262, hash module 263, and SSD notifier 263 may be distinct modules that are separate from streaming module 260. In one embodiment, streaming module 260 corresponds to a streaming module 109A-Y of FIG. 1.

In some implementations, I/O controller 250 may invoke streaming module 260 to apportion write request traffic to a number of streams allotted to I/O controller 250. I/O controller 250 may receive a notification from a management controller (e.g., management module 115 of FIG. 1) that indicates the number of streams allotted to I/O controller 250. Alternatively, I/O controller 250 may receive the notification from a host computing device (e.g., host computing devices 104A-X of FIG. 1) to which it is connected. Streaming module 260 may then determine how to divide the write request traffic between those streams.

In an illustrative example, I/O controller 250 may divide the number of streams according to service level agreements for the applications that may be sending the write requests. I/O controller 250 may have negotiated multiple different RDMA queue pairs with a host computing device where each RDMA queue pair is associated with a different service level agreement. Applications executing on the host computing device that require the same level of service (e.g., those using the same RDMA queue pair) may be routed to the same stream (e.g., by assigning the same stream tag to each of their corresponding write requests).

I/O controller 250 may also divide the traffic for its allotted streams by particular sets of properties, but leaving one stream as a catch-all for all other traffic. Thus, if I/O controller is allotted three streams, the first stream may be used for a first set of properties, the second stream for a second set of properties and the third stream may be used for all other traffic. For example, I/O controller 250 may divide the traffic by expected volume of the associated applications. An application 'A' that is expected to generate a high number of write requests may be assigned its own stream, applications 'B', and 'C', that are expected to generate moderate traffic may be assigned a second stream, and all other applications may be assigned to the third stream.

Upon receiving a write request, write module 258 may invoke streaming module 260 to generate a stream tag for the request. Write module 258 may invoke streaming module 260 to generate the stream tag prior to generating the individual the write commands 272 for particular SSDs, or alternatively may invoke streaming module 260 after generating each of the write commands 272.

In one embodiment, streaming module 260 may invoke attribute determiner 261 to determine attribute values of one or more attributes associated with the write request. In some implementations, the attributes can include at least one of a client identifier, an application identifier, a remote direct memory access (RDMA) queue pair identifier, or a logical unit number (LUN) associated with the virtual storage device (e.g., virtual drives 180A-X). The attributes associated with the request may be received directly from a host based on a request sent by attribute determiner 261, may be received from the host and stored in a configuration file (e.g., stream configuration data 224), may be received from a management module of the storage server and stored in a configuration file (e.g., stream configuration data 224), or may be received and/or determined in any other manner.

Streaming module 260 may then invoke stream tag generator 262 to generate the stream tag for the write request. Once generated, the stream tag may be used for each of the write commands 272 that are associated with the write request. As noted above, the stream tag may be generated based on the attribute values of the one or more attributes associated with the write request. In one embodiment, stream tag generator 262 may assign a predefined value stored in stream configuration data 224 as the stream tag. Alternatively, stream tag generator 262 may invoke hash module 263 to generate the stream tag.

Hash module 263 may first receive an indication of a hash function and the one or more attributes to use with the hash function. In one embodiment, hash module 263 may access stream configuration data 224 to obtain this information. Alternatively, hash module 263 may receive this information from a management module of the storage server. The management module, having access to information around each of the host computing devices and SSDs associated with the storage server may send information to each I/O controller of the storage server to indicate a hash function to execute and which attributes to use as inputs to the hash function.

In one embodiment, the range of hash values producible by the hash function with the one or more attributes is equal to a number of active streams supported by the SSD. For example, if the write command is to be directed to an SSD with 16 active streams, the information received by a hash module 263 can direct it to produce 16 unique values using the hash function.

In one embodiment, where I/O controller 250 has been allocated a specified number of streams, hash module 263 can direct the hash function to produce a number of unique hash values that is equal to the specified number of streams. For example, if I/O controller 250 has been allocated 4 streams of a total of 16 streams supported by any of the SSDs in the storage server, the information received by hash module 263 can direct it to produce 4 unique values using the hash function.

Once the stream tag has been generated for the write request, streaming module 260 may return the stream tag to write module 258, which may then send a write command to one of the SSDs in the storage server. The write command can include a portion of the data for the write request along with the stream tag, where the stream tag causes the SSD to write the portion of the data to a block of the SSD that is reserved for data with that particular stream tag.

In some embodiments, write module 258 may determine that a second portion of the data from the write request is to be written to a second SSD of the plurality of SSDs in the storage server. As noted above, this may occur when the original write request causes write module 258 to create multiple write commands to write to different SSDs. A portion of the data for the write request may be written to each of the different SSDs. In such implementations, write module 258 may send a second write command to the second SSD with the second portion of the data and the stream tag generated for the write request. The stream tag can cause the second SSD to write the second portion of the data to a block of the SSD that is reserved for data with that stream tag.

In some embodiments, write module 258 may receive a second write request from a second requestor. The second requestor may be a second application executing on the same host computing device as the first requestor. Alternatively, the second requestor may be an application executing on a different host computing device. The second write request may be to write data to a second logical address of a virtual storage device that is mapped to the plurality of SSDs in the storage server.

As with the request from the first requestor, streaming module 260 may be invoked to generate a tag for the second request. Streaming module 260 may invoke attribute determiner 261 to determine additional attribute values of one or more additional attributes associated with the write request. In some implementations, the one or more additional attributes used for the second request may be the same as the one or more attributes used for the first request. Alternatively, the one or more additional attributes may be different from the one or more attributes used for the first request. For example, if I/O controller 250 receives an indication that it has been allocated two streams, streaming module 260 may determine that a single high volume application may be assigned to one stream and all other applications may be assigned to the other. In this example, attribute determiner 261 could use the client identifier (or host computing device identifier), LUN identifier, and an application identifier as attributes to tag the write requests for that application. Attribute determiner 261 could use client identifier and LUN identifier without the application identifier as attributes to generate the tags for all other write requests received by I/O controller 250.

Stream tag generator 262 may then be invoked to generate a second stream tag for the second request based on the one or more additional attributes associated with the second write request. In some implementations, hash module 263 may be invoked to generate the tag using a hash function as described above. Once the second stream tag has been generated for the second write request, streaming module 260 may return the second stream tag to write module 258, which may then send a write command to one of the SSDs in the storage server. The write command can include a portion of the data for the second write request along with the second stream tag, where the stream tag causes the SSD to write the portion of the data for the second write request to a block of the SSD that is reserved for data with that particular stream tag. In some embodiments the write command may be directed to the same SSD that received at least one of the write commands associated with the write request from the first requestor. In such embodiments, the block of the SSD reserved for the second tag may be a different block than that reserved for the tag associated with a write request from the first requestor. Similarly, the block reserved for the second tag may be a different block than that reserved for any other tags for streams allocated to I/O controller 250. Alternatively, the write command may be directed to a different SSD in the storage server.

In one embodiment, I/O controller 250 may notify an SSD when a stream has terminated so that any blocks on the SSD reserved for that stream may be deleted and released for reuse. For example, if a stream has been dedicated to a particular application that has terminated execution and should not restart, the stream may be reallocated for another use. Thus, the data stored on any SSD associated with that stream tag may be deleted from the SSD. Streaming module 260 may first determine that a stream has terminated. Streaming module 250 may make this determination by receiving a notification from an application, accessing a configuration file that has been updated by an application (e.g., stream configuration data 224), or in any other manner. Streaming module 260 may then invoke SSD notifier 263 to send a notification to an SSD in the storage server that includes the stream tag of the terminated stream. This notification can cause the SSD to mark the block reserved for that stream to be erased. The SSD may erase the block immediately, or may mark the block as eligible for deletion during the next garbage collection operation for the SSD.

Figure 2B:
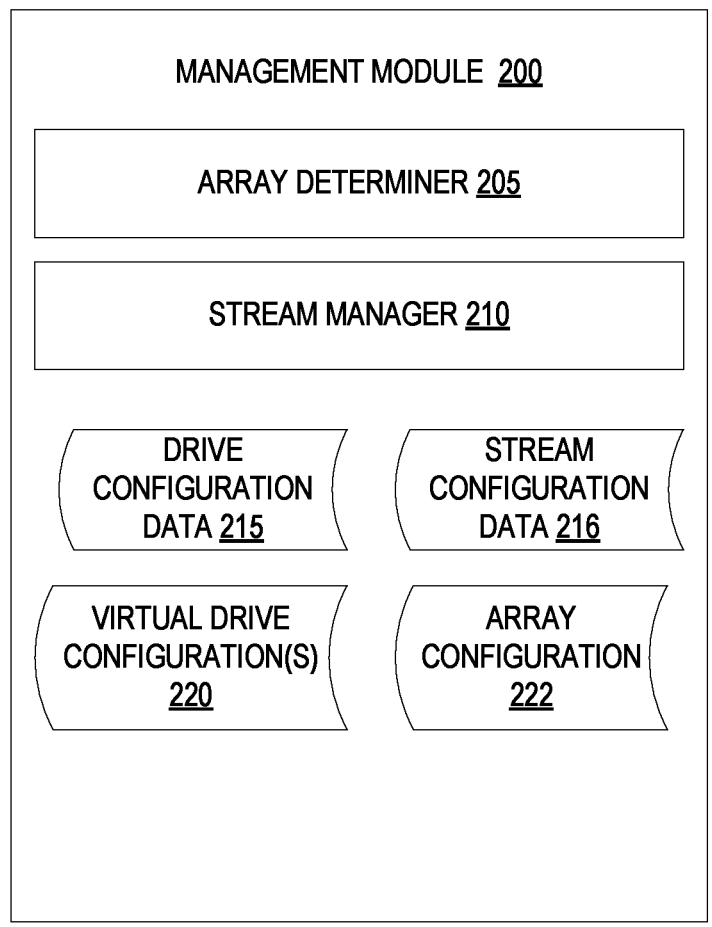
FIG. 2B is a block diagram of one embodiment of a management module.

FIG. 2B is a block diagram of one embodiment of a management module 200 showing logical modules that may be loaded into and executed by a processing device of management module 200. Alternatively, management module 200 may include one or more physical modules (e.g., an integrated circuit (IC) designed with described modules or a configurable logic such as a field programmable gate array (FPGA) configured to have the modules). In one embodiment, the management module 200 is a SoC that includes a processing device, a memory, one or more ports, and so on. In one embodiment, management module 200 includes the modules of an array determiner 205 and a stream manager 210. Alternatively, the functionality of the array determiner 205 and/or stream manager 210 may be divided into additional modules or may be combined into a single module. In one embodiment, management module 200 corresponds to management module 115 of FIG. 1.

Array determiner 205 identifies available storage devices and may determine how those storage devices are to be configured into an array, and may store such information as array configuration 222. Array determiner 205 additionally determines how to divide the array of storage devices into virtual drives, and this information may be included in virtual drive configuration(s) 220. Array determiner 205 may determine how many virtual drives to create, the sizes of those virtual drives, and what physical addresses of the storage devices to allocate to each virtual drive. Once the configurations for the virtual drives are determined, array determiner 205 sends the virtual drive configurations 220 to I/O controllers. The I/O controllers may then use the received virtual drive configurations 220 to establish and maintain the virtual drives.

Stream manager 210 may be responsible for managing stream operations for the SSDs of a storage server. Stream manager 210 may receive attribute information from the SSDs on the storage server to determine and assign streams for each of the SSDs and/or each of the I/O controllers in the storage server. In one embodiment, stream manager 210 may store the received attribute information in drive configuration data 215 and use that information to manage streams across the SSDs in the storage server. Attribute information may include the manufacturer identifier of each SSD (e.g., a device identifier), the capacity of the drive, the number of active streams supported by the SSD, or other similar device characteristics. This information may be identified by sending a message to the SSD and receiving a response. Alternatively, this information may be identified when the SSD is added to the storage server. The information may also be received from the SSD vendor and stored in drive configuration data 215 prior to adding the SSD to the storage server.

Stream manager 210 may determine a number of active streams supported by an SSD in the storage server. This determination may be made by accessing drive configuration data 215. Stream manager 210 may then identify a plurality of I/O controllers of the storage server. Stream manager 210 may then divide the number of active streams between the plurality of I/O controllers and notify each I/O controller of a subset of the number of active streams that is assigned to that I/O controller. Stream manager 210 may store these assignments in a configuration file such as stream configuration data 216.

Stream manager 210 may additionally determine parameters that should be used by the I/O controllers in the storage server when generating stream tags for their allocated streams. In one embodiment, stream manager 210 may determine a hashing function and one or more attributes that, when used together by an I/O controller, can produce a number of unique hash values that is equal to the number of streams in the subset of the number of active streams that has been assigned to that I/O controller. Stream manager 210 may make this determination for each of the I/O controllers in the storage server. In some implementations, stream manger 210 may then notify each I/O controller by sending the hash function and an indication of the one or more attributes to use as inputs for the hash function.

The one or more attributes may be the attributes as described above with respect to FIGS. 1-2A. Stream manager 210 may determine the attributes by accessing configuration data that stores information about the storage server, the associated host computing devices, or the like (e.g., drive configuration data 215, virtual drive configuration 220, array configuration 222, etc.). Alternatively, or additionally, stream manager 210 may determine the attributes by examining realtime statistics of the components of the storage server and the host computing devices connected to the storage server. Similarly, stream manager 210 may determine the hashing function using the stored configuration data and/or real time statistics of the system.

In one embodiment, stream manager 210 may determine a hashing function and one or more attributes that, when used together by an I/O controller can produce a number of unique hash values that is equal in number to the number of active streams supported by an SSD in the storage server. In some implementations, stream manger 210 may then notify each I/O controller by sending the hash function and an indication of the one or more attributes to use as inputs for the hash function.

Figure 3:
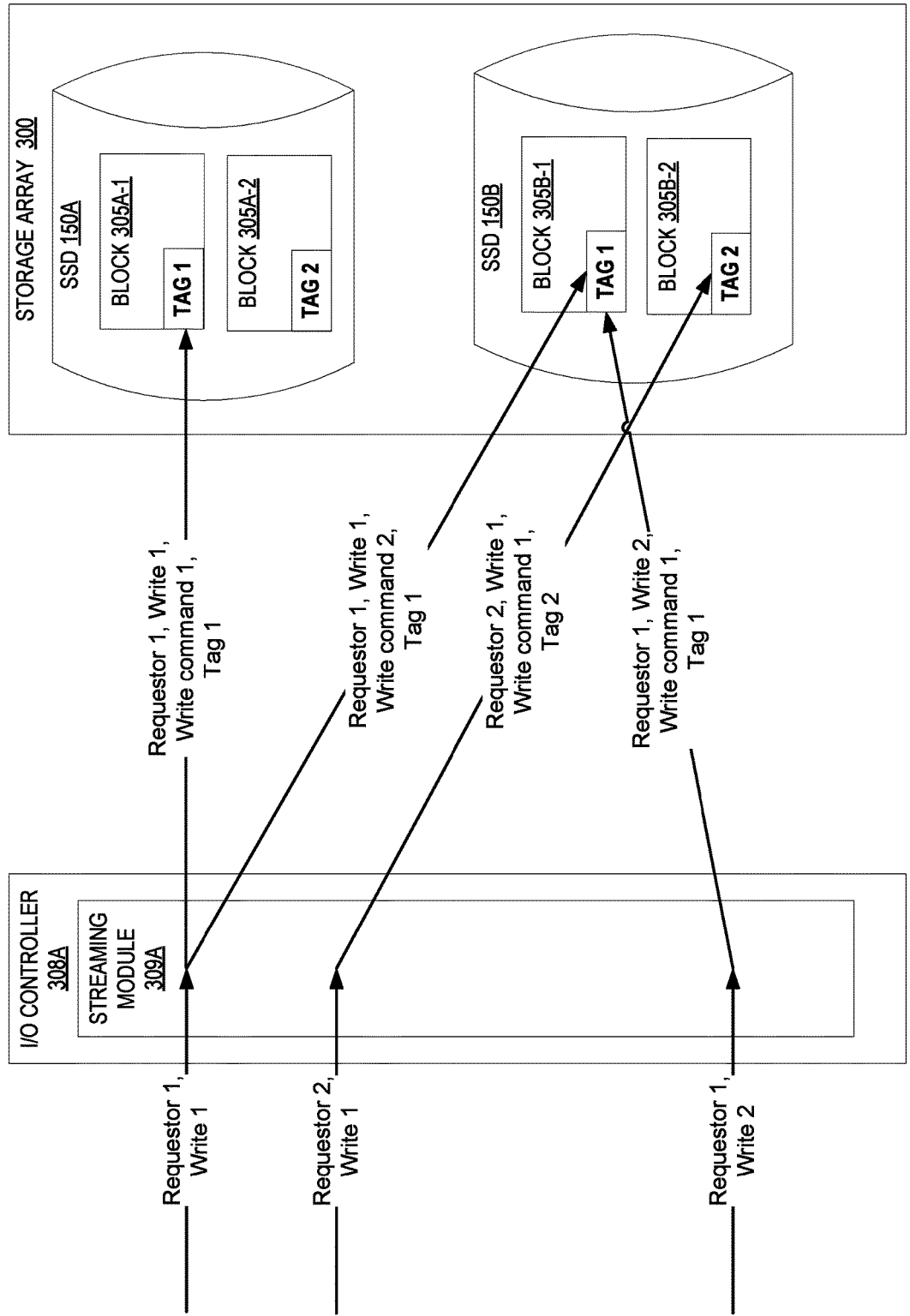
FIG. 3 is a block diagram of one embodiment of streaming data to a solid state storage device (SSD) array.

FIG. 3 is a block diagram of one embodiment of streaming data to a solid state storage device (SSD) array. In one embodiment, storage array 300 corresponds to SSDs 150A-Z of FIG. 1, and I/O controller 308A corresponds to an I/O controller 108A-Y of FIG. 1, and/or an I/O controller 260 of FIG. 2A.

As shown in FIG. 3, a first write request may be received by I/O controller 308A from a first requestor ("Requestor 1, Write 1"). I/O controller 308A may then invoke stream module 309A to generate a stream tag for the request (Tag 1). In some implementations, stream module 309A corresponds to stream module 260 of FIG. 2A, and may generate the tag as described above with respect to FIGS. 1-2A. I/O controller 308A may generate two write commands ("Requestor 1, Write 1, Write command 1" and "Requestor 1, Write 1, Write command 2") each marked with the same tag ("Tag 1"). The first write command may be directed to SSD 150A of storage array 300. SSD 150A, upon receiving the write command with its associated tag, may then store the data from the first write command in data block 305A-1 (e.g., the block reserved for "Tag 1" on SSD 150A). The second write command may be directed to SSD 150B of storage array 300. SSD 150B, upon receiving the second write command with its associated tag, may then store the data from the second write command in data block 305B-1 (e.g., the block reserved for "Tag 1" on SSD 150B).

At a later time, I/O controller 308A may receive a write request from a second requestor ("Requestor 2, Write 1"). I/O controller 308A may then invoke stream module 309A to generate a stream tag for that request ("Tag 2"). I/O controller 308A may then generate one write command ("Requestor 2, Write 1, Write command 1") marked with that tag ("Tag 2"). The write command for "Requestor 2, Write 1" may be directed to SSD 150B of storage array 300. SSD 150B, upon receiving the write command with its associated tag, may then store the data from the write command in data block 305B-2 (e.g., the block reserved for "Tag 2" on SSD 150B). As shown in FIG. 3, since the tag for this write command ("Tag 2") is different than the tag for the write command of "Requestor 1, Write 1, Write command 2" ("Tag 1"), the data should be written to a different block on SSD 150B even though the two write commands have been directed to the same SSD.

Subsequently, I/O controller may receive a second write request from the first requestor ("Requestor 1, Write 2"). I/O controller may then invoke stream module 309A to generate a stream tag for that request. In some implementations, the tag may be generated at least in part based on the requestor, so all write requests for a requestor should result in one of a few tags being used for write requests received from that requestor. Thus, as shown in FIG. 3, the write command for "Requestor 1, Write 2" is also assigned "Tag 1". I/O controller 308A may then generate one write command ("Requestor 1, Write 2, Write command 1") marked with that tag ("Tag 2"). The write command may be directed to SSD 150B of storage array 300. SSD 150B, upon receiving the write command with its associated tag, may then store the data from the write command in data block 305B-1 (e.g., the block reserved for "Tag 1" on SSD 150B).

Figure 4:
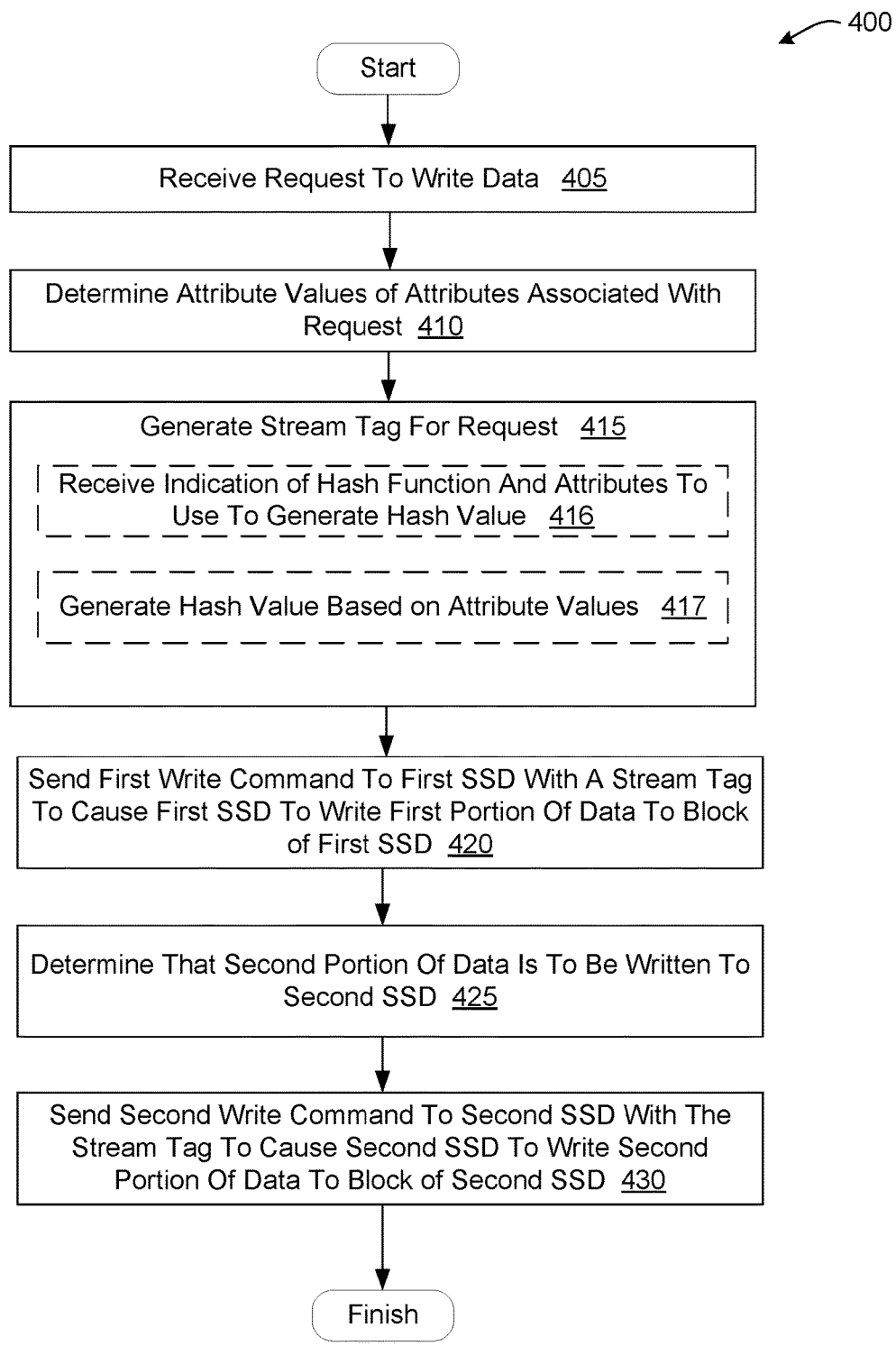
FIG. 4 is a flow diagram of one embodiment for a method of streaming data for a single write request.
Figure 5:
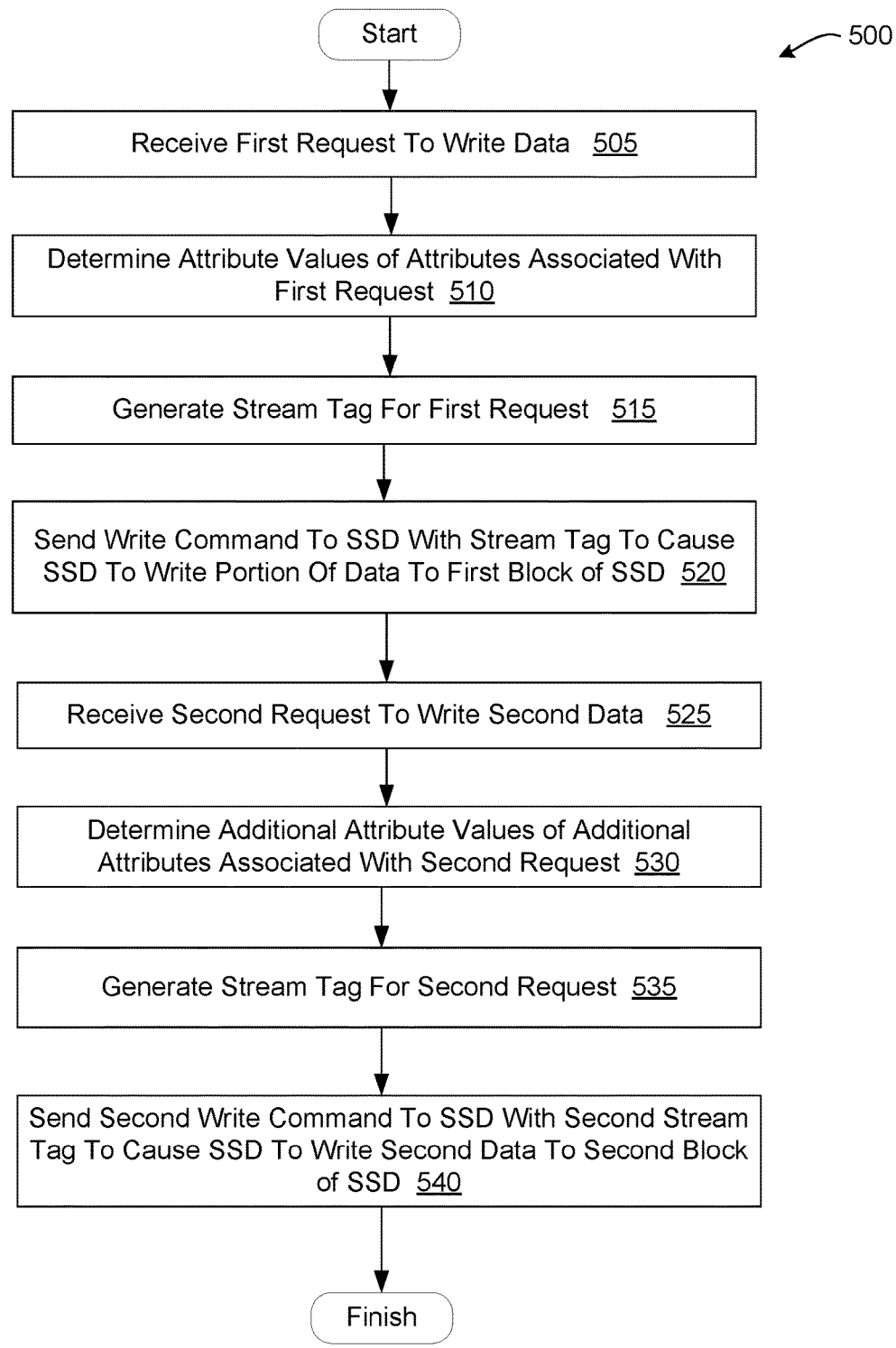
FIG. 5 is a flow diagram of one embodiment for a method of streaming data for multiple write requests.
Figure 6:
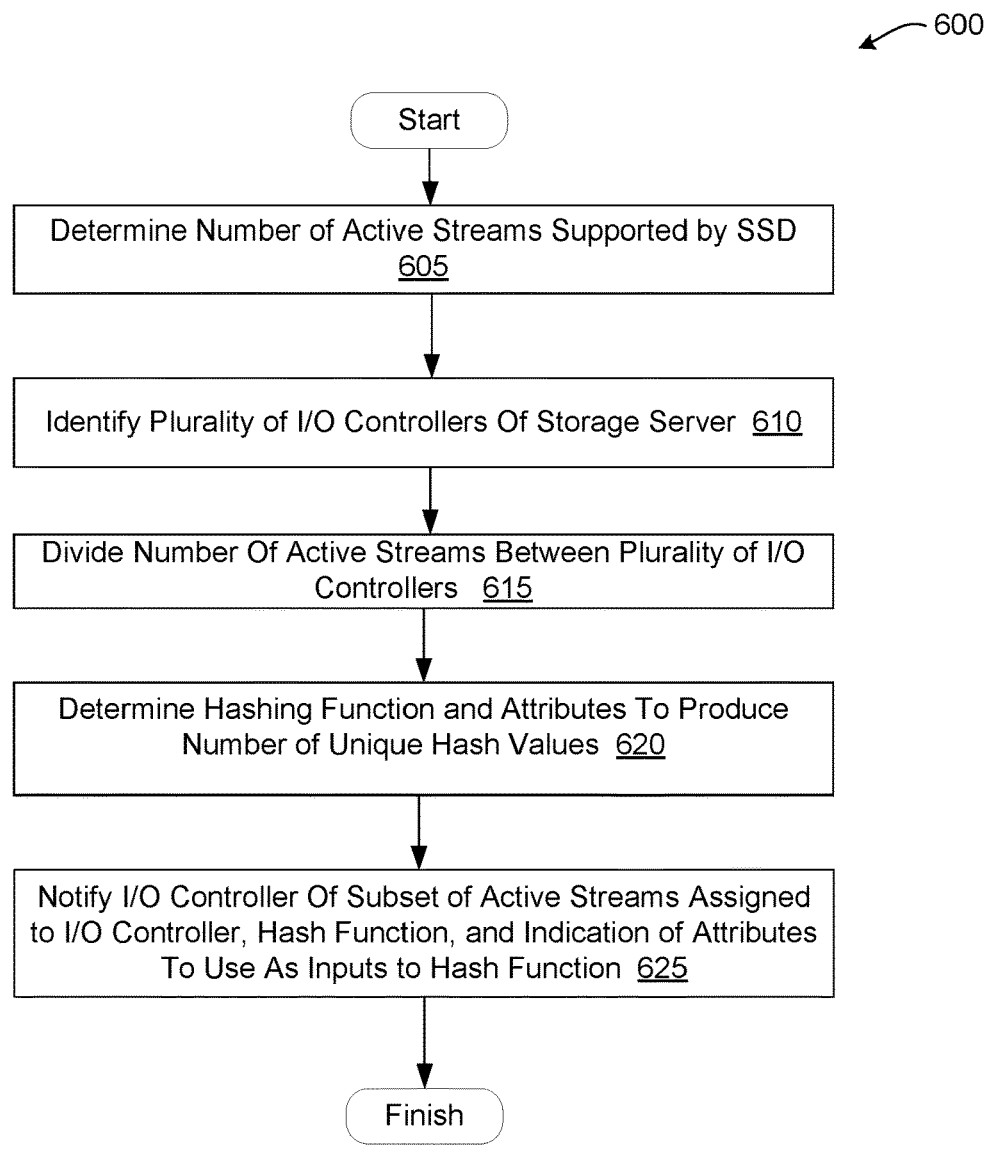
FIG. 6 is a flow diagram of one embodiment for a method of managing streams by a management controller of a storage server.

FIGS. 4-6 are flow diagrams of various implementations of methods related to providing data streams across multiple controllers. The methods are performed by processing logic that may include hardware (circuitry, dedicated logic, etc.), software (such as is run on a general purpose computer system or a dedicated machine), or a combination of both. Some methods may be performed by a streaming module such as streaming modules 109A-Y of FIG. 1, streaming module 260 of FIG. 2A, stream manager 210 of FIG. 2B, or streaming module 309A of FIG. 3. Some methods may be performed by an I/O controller such as any I/O controller 108A-Y of FIG. 1, I/O controller 250 of FIG. 2, or I/O controller 308A of FIG. 3. Some methods may be performed by a management module such as management module 115 of FIG. 1, or management module 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram of one embodiment for a method 400 of streaming data for a write request. Method 400 may be performed, for example, by an I/O controller. At block 405 of method 400, processing logic receives a request from a first requestor to write data to a first logical address of a virtual storage device that is mapped to a plurality of SSDs. At block 410, processing logic determines attribute values of one or more attributes associated with the request received at block 405. In some implementations, the one or more attributes may include at least one of a client identifier assigned to the host device from which the request was received, an application identifier of an application running on a host device that caused the request to be generated, a remote direct memory access (RDMA) queue pair identifier for an RDMA queue pair negotiated between the host device and a storage server, or a logical unit number (LUN) associated with the virtual storage device.

At block 415, processing logic generates a stream tag for the request based on the attribute values of the one or more attributes associated with the request received at block 405. In one embodiment, processing logic may execute block 416 to receive an indication of a hash function and attributes to use to generate a hash value. In some implementations, the range of hash values producible by the hash function with the one or more attributes is equal to a number of active streams supported by a first SSD of the plurality of SSDs to which the data may be written. In some implementations, the hash function, when executed by a particular I/O controller that received the write request, produces a number of unique hash values that is equal to a specified number of streams allocated to the I/O. Processing logic may then execute block 417 to generate a hash value based on the attribute values of the one or more attributes associated with the request using the hash function indicated at block 416.

At block 420, processing logic sends a first write command to a first SSD of the plurality of SSD. In some implementations, the first write command may include a first portion of the data and the stream tag generated at block 415, where the stream tag causes the first SSD to write the first portion of the data to a block of the first SSD.

At block 425, processing logic determines that a second portion of the data is to be written to a second SSD. At block 430, processing logic sends a second write command to the second SSD. In some implementations, the second write command includes the second portion of the data and the stream tag generated at block 415, where the stream tag causes the second SSD to write the second portion of the data to a block of the second SSD. Additional write commands may also be sent to the first SSD, the second SSD and/or additional SSDs until all of the data from the write request has been written to SSDs. After block 430, the method of FIG. 4 terminates.

FIG. 5 is a flow diagram of one embodiment for a method 500 of streaming data for multiple write requests. Method 500 may be performed, for example, by an I/O controller. At block 505 of method 500, processing logic receives a request from a first requestor to write data to a first logical address of a virtual storage device that is mapped to a plurality of SSDs. The first requestor may be a first host computing device. At block 510, processing logic determines attribute values of one or more attributes associated with the request received at block 505. In some implementations, the one or more attributes may include at least one of a client identifier, an application identifier, a remote direct memory access (RDMA) queue pair identifier, or a logical unit number (LUN) associated with the virtual storage device.

At block 515, processing logic generates a stream tag for the request based on the attribute values of the one or more attributes associated with the request received at block 505. At block 520, processing logic sends a first write command to an SSD of the plurality of SSDs. In some implementations, the first write command may include a portion of the data and the stream tag generated at block 515, where the stream tag causes the SSD to write the first portion of the data to a first block of the SSD.

At block 525, processing logic receives a second request from a second requestor to write a second data to a second logical address of a virtual storage device that is mapped to the plurality of SSDs. At block 530, processing logic determines additional attribute values of one or more additional attributes associated with the second request received at block 520. In some implementations, the additional attributes associated with the second request may be the same as the attributes associated with the first request, but with different attribute values. Alternatively, the additional attributes may be different from those attributes associated with the first request.

At block 535, processing logic generates a stream tag for the second request based on the additional attribute values of the one or more additional attributes associated with the second request received at block 525. In some implementations, the stream tag for the second request may be a different value than that generated for the first request. At block 540, processing logic sends a second write command to the same SSD as that written to by the first write command of block 515. In some implementations, the second write command may include a portion of the second data and the stream tag for the second request generated at block 535, where the stream tag causes the SSD to write the portion of the second data to a second block of the SSD. After block 540, the method of FIG. 5 terminates.

FIG. 6 is a flow diagram of one embodiment for a method 600 of managing streams by a management controller of a storage server. Method 600 may be performed, for example, by a management module. At block 605 of method 600, processing logic determines a number of active streams supported by an SSD of a plurality of SSDs of a storage server. At block 610, processing logic identifies a plurality of I/O controllers of the storage server At block 615, processing logic divides a number of active streams between the plurality of I/O controllers.

At block 620, processing logic determines a hashing function and one or more attributes that, when used together, can produce a number of unique hash values. In one embodiment, the hashing function, when used by a first I/O controller of the plurality of I/O controllers, can produce a number of unique hash values that is equal to a number of streams in a subset of the number of active streams that has been assigned to the first I/O controller. Additionally, or alternatively, the hashing function, when used by the plurality of I/O controllers, may produce a number of unique hash values that is equal to a number of streams in a subset of the number of active streams that has been assigned to the second I/O controller. For example, if there are a total of 10 streams supported by the SSD, then the hash function may generate a total of 10 unique values. If the number of streams are divided evenly between 5 I/O controllers in a further example, then the hash function may produce two different unique values when used by each of the different I/O controllers (e.g., values 1-2 for a first I/O controller, values 3-4 for a second I/O controller, and so on). In one embodiment, the hashing function can produce a number of unique hash values that is equal to the number of active streams supported by the SSD determined at block 605.

At block 625, processing logic notifies each I/O controller of the plurality of I/O controllers of a subset of the number of active streams that is assigned to that I/O controller. In one embodiment, notifying each I/O controller can include sending to the I/O controller the hash function and an indication of the one or more attributes to use as inputs for the hash function. Alternatively, each of the I/O controllers may make their own selection of hash functions and/or attributes to use for hash functions based on the number of unique streams that have been assigned to them. Note that in some embodiments different I/O controllers may be assigned different hash functions and/or different attributes to use for generating stream tags. After block 625, the method of FIG. 6 terminates.

In some embodiments, SSDs may support a larger number of streams than the number of active streams. An active stream is a stream that is currently open (in context). It is possible to swap out active streams from a total pool of streams based on application behavior or administrator interference. For example, an SSD may support 10 total streams and 5 active streams. At any given time the active streams may change between a pool of 10 streams.

Figure 7:
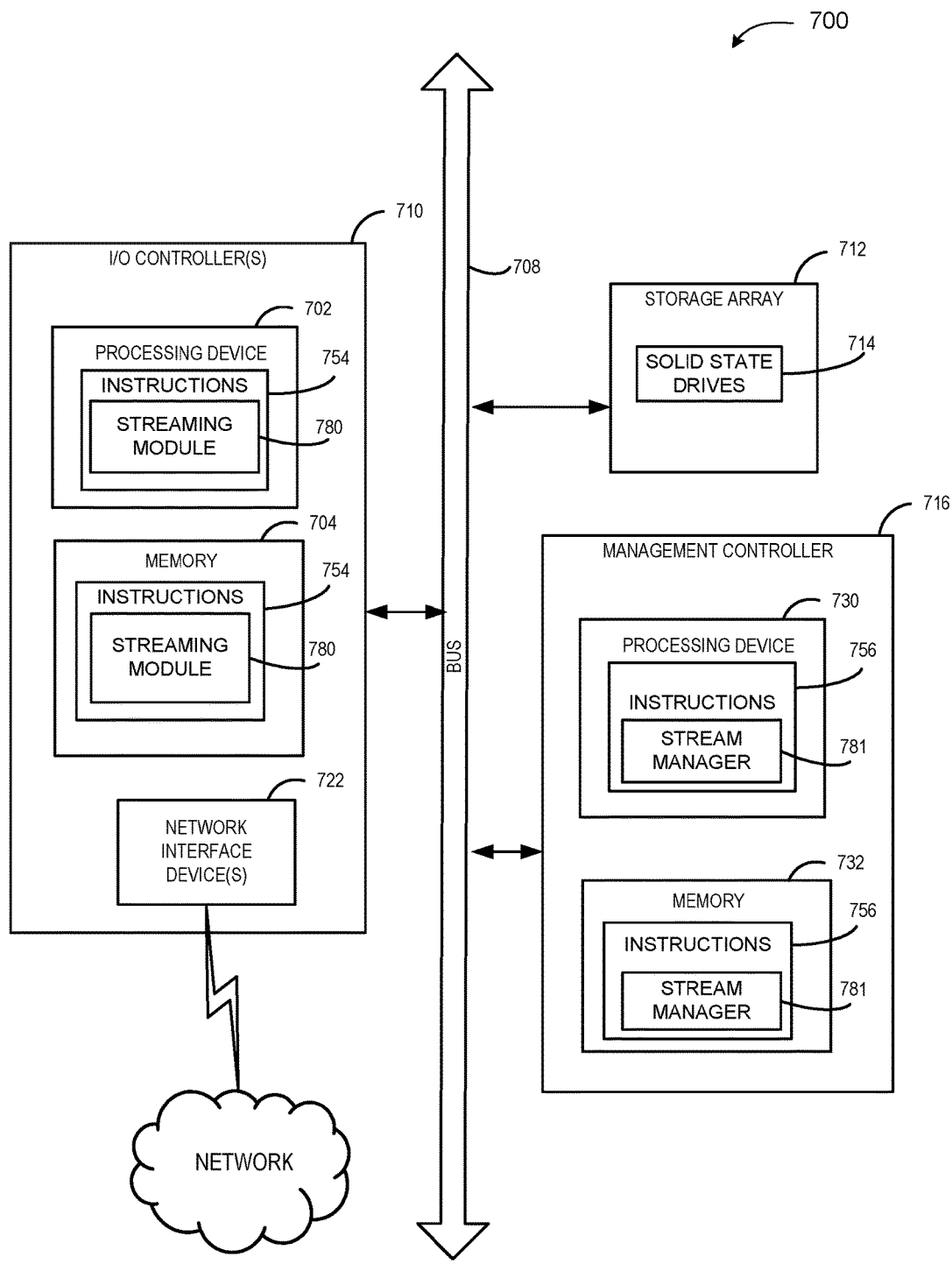
FIG. 7 illustrates an example computing device, in accordance with one embodiment.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes one or more I/O controllers 710, a storage array 712, and a management controller 716 (or multiple management controllers 716), which communicate with each other via a bus 708. Bus 708 may include one or more switches (e.g., switch 110 of FIG. 1) and one or more storage fabrics (also referred to as backplane fabrics). Each storage fabric includes hardware (e.g., switches, etc.) that connects I/O controllers 710 to SSDs 714. Each storage fabric may include a fabric board (e.g., a printed circuit board (PCB) that includes multiple hardware components. Alternately, multiple storage fabrics may be part of a single backplane printed circuit board (PCB). Each storage fabric enables any I/O controller 710 to connect to any SSD 714. Each storage fabric may be independent of other storage fabrics, using its own hardware, ports, connections, etc. that are distinct from those used by the other storage fabrics. Accordingly, if any component in a storage fabric fails and causes that storage fabric to fail, the I/O controllers 710 may continue to maintain connections to the SSDs 714 via an alternative storage fabric.

Each I/O controller 710 represents a device configured to connect one or more host computing devices to one or more SSDs (e.g., I/O controller 108A-Y of FIG. 1). An I/O controller 710 includes a processing device 702, and a memory 704 (e.g., read-only memory (ROM), flash memory, dynamic random access memory (DRAM) such as synchronous DRAM (SDRAM) or Rambus DRAM (RDRAM), etc.). The I/O controller 710 may further include one or more network interface devices 722 to connect to a network. In one embodiment, each I/O controller 710 is a system on a chip (SoC) including processing device 702, memory 704, and one or more network interface devices 722.

Management controller 716 represents a device configured to manage a storage fabric. Management controller 716 may include a memory 732 having instructions 756 and a processing device 730 that loads and executes those instructions 756. The instructions 756 may include a stream manager 781 (e.g., as described above with respect to FIGS. 1 and 2B), and/or a software library containing methods that call a stream manager 781. Memory 732 may be read-only memory (ROM), flash memory, dynamic random access memory (DRAM) such as synchronous DRAM (SDRAM) or Rambus DRAM (RDRAM), etc. In one embodiment, management controller 716 is a system on a chip (SoC) including processing device 730 and memory 732.

Processing device 702 and/or processing device 730 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute processing logic (e.g., instructions 754) for performing operations discussed herein.

The memory 704 may be a machine-readable storage medium (or more specifically a computer-readable storage medium) on which is stored one or more sets of instructions 754 embodying any one or more of the methodologies or functions described herein. The instructions 754 may also reside, completely or at least partially, within the processing device 702 during execution thereof by the I/O controller 710, the processing device 702 also constituting computer-readable storage media. Alternatively, or additionally, the instructions 754 may be resident on a solid state storage drive (e.g., a solid state storage drive 714) and/or a hard disk drive connected to bus 708.

The instructions may include a streaming module 780 (e.g., as described above with respect to FIGS. 1-2B), and/or a software library containing methods that call a streaming module 780. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 712 represents a device that contains a group of solid state drives (SSDs) 714. Storage array 712 may arrange SSDs 714 into logical redundant storage containers, or a redundant array of independent disks (RAID). The storage array 712 may distribute data across the SSDs 714 in one of several RAID levels to provide different levels of redundancy and performance. In some implementations, storage array 712 may include one group of SSDs 714 for data and another group of SSDs 714 for recovery purposes. SSDs 714 may be SAS/SATA drives, non-volatile memory express (NVMe) drives, small computer system interface (SCSI) over PCIe (SOP) drives, or solid state drives that communicate using different protocols. The number of SSDs 714 included in storage array 712 may be less than 10 to more than 100. The SSDs 714 may have the same or different storage capacities.

The management controller 716 may be a device configured to perform particular operations with regards to management of the array of SSDs 714 in storage array 712. Management controller 716 may include a volatile and/or non-volatile memory to store one or more sets of instructions 754 embodying any one or more of the methodologies or functions described herein.

The modules, components and other features described herein (for example in relation to FIGS. 2A-2B) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "generating", "sending", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a storage server that manages a plurality of solid state storage devices (SSDs), a request from a first requestor to write data to a first logical address of a virtual storage device that is mapped to the plurality of SSDs;
determining, by the processing device, attribute values of one or more attributes associated with the request;
generating a stream tag for the request based on the attribute values of the one or more attributes associated with the request; and
sending a first write command to a first SSD of the plurality of SSDs, the first write command comprising a first portion of the data and the stream tag, wherein the stream tag causes the first SSD to write the first portion of the data to a first block of the first SSD.

2. The method of claim 1, wherein the one or more attributes comprises at least one of a client identifier, an application identifier, a remote direct memory access (RDMA) queue pair identifier, or a logical unit number (LUN) associated with the virtual storage device.

3. The method of claim 1, wherein generating the stream tag comprises:
generating a hash value based on the attribute values of the one or more attributes,
wherein the hash value is the stream tag for the request.

4. The method of claim 3, further comprising:
receiving an indication of a hash function and the one or more attributes to use as inputs for the hash function to generate the hash value, wherein a range of hash values producible by the hash function with the one or more attributes is equal to a number of active streams supported by the first SSD.

5. The method of claim 3, further comprising:
receiving an indication of a hash function and the one or more attributes to use as input for the hash function to generate the hash value, wherein the processing device has been allocated a specified number of streams, and wherein use of the hash function with the one or more attributes by the processing device produces a number of unique hash values that is equal to the specified number of streams.

6. The method of claim 1, further comprising:
determining that a second portion of the data is to be written to a second SSD of the plurality of SSDs; and
sending a second write command to the second SSD of the plurality of SSDs, the second write command comprising the second portion of the data and the stream tag, wherein the stream tag causes the second SSD to write the second portion of the data to a second block of the second SSD.

7. The method of claim 1, further comprising:
receiving a second request from a second requestor to write second data to a second logical address of a virtual storage device that is mapped to the plurality of SSDs;
determining additional attribute values of one or more additional attributes associated with the second request;
generating a second stream tag for the second request based on the additional attribute values of the one or more additional attributes associated with the second request; and sending a second write command to the first SSD, the second write command comprising a portion of the second data and the second stream tag, wherein the second stream tag causes the first SSD to write the portion of the second data to a second block of the first SSD.

8. The method of claim 1, further comprising:
determining that a first stream associated with the stream tag has been terminated; and sending a notification to the first SSD, the notification comprising the stream tag, wherein the notification causes the first SSD to mark the first block of the first SSD to be erased.

9. A method comprising:
determining, by a processing device of a storage server that manages a plurality of solid state storage devices (SSDs), a number of active streams supported by an SSD of the plurality of SSDs;
identifying a plurality of I/O controllers of the storage server; dividing the number of active streams between the plurality of I/O controllers; and notifying each I/O controller of the plurality of I/O controllers of a subset of the number of active streams that is assigned to that I/O controller.

10. The method of claim 9, further comprising:
determining a hashing function and one or more attributes that, when used together by a first I/O controller of the plurality of I/O controllers, will produce a number of first unique hash values that is equal to a number of streams in the subset of the number active streams that has been assigned to the first I/O controller;
wherein notifying each I/O controller of the plurality of I/O controllers comprises sending to the I/O controller the hash function and an indication of the one or more attributes to use as inputs for the hash function.

11. The method of claim 10, wherein the hashing function and the one or more attributes, when used together by a second I/O controller of the plurality of I/O controllers, will produce a number of second unique hash values that is equal to a number of streams in the subset of the number of active streams that has been assigned to the second I/O controller.

12. The method of claim 9, further comprising:
determining a hashing function and one or more attributes that, when used together, will produce a number of unique hash values that is equal to the number of active streams supported by the SSD;
wherein notifying each I/O controller of the plurality of I/O controllers comprises sending to the I/O controller the hash function and an indication of the one or more attributes to use as inputs for the hash function.

13. A storage server comprising:
a plurality of solid state storage devices (SSDs); and
an I/O controller coupled to the plurality of SSDs via at least one of a switch or a bus, the I/O controller comprising a processing device that is to:
receive, by the processing device, a request from a first requestor to write data to a first logical address of a virtual storage device that is mapped to the plurality of SSDs;
determine, by the processing device, attribute values of one or more attributes associated with the request;
generate a stream tag for the request based on the attribute values of the one or more attributes associated with the request; and
send a first write command to a first SSD of the plurality of SSDs, the first write command comprising a first portion of the data and the stream tag, wherein the stream tag causes the first SSD to write the first portion of the data to a first block of the first SSD.

14. The storage server of claim 13, wherein to generate the stream tag, the processing device is to:
generating a hash value based on the attribute values of the one or more attributes, wherein the hash value is the stream tag for the request.

15. The storage server of claim 14, wherein the processing device is further to:
receive an indication of a hash function and the one or more attributes to use as inputs for the hash function to generate the hash value, wherein a range of hash values producible by the hash function with the one or more attributes is equal to a number of active streams supported by the first SSD.

16. The storage server of claim 14, wherein the processing device is further to: receive an indication of a hash function and the one or more attributes to use as input for the hash function to generate the hash value, wherein the processing device has been allocated a specified number of streams, and wherein use of the hash function with the one or more attributes by the processing device produces a number of unique hash values that is equal to the specified number of streams.

17. The storage server of claim 13, wherein the processing device is further to: determine that a second portion of the data is to be written to a second SSD of the plurality of SSDs; and
send a second write command to the second SSD of the plurality of SSDs, the second write command comprising the second portion of the data and the stream tag, wherein the stream tag causes the second SSD to write the second portion of the data to a second block of the second SSD.

18. The storage server of claim 13, wherein the processing device is further to: receive a second request from a second requestor to write second data to a second logical address of a virtual storage device that is mapped to the plurality of SSDs;
determine additional attribute values of one or more additional attributes associated with the second request;
generate a second stream tag for the second request based on the additional attribute values of the one or more additional attributes associated with the second request; and
send a second write command to the first SSD, the second write command comprising a portion of the second data and the second stream tag, wherein the second stream tag causes the first SSD to write the portion of the second data to a second block of the first SSD.

19. The storage server of claim 13, further comprising a management controller coupled to the plurality of SSDs via at least one of the switch or the bus, the management controller comprising a second processing device that is to:
determine, by the second processing device, a number of active streams supported by an SSD of the plurality of SSDs;
identify a plurality of additional I/O controllers of the storage server;
divide the number of active streams between the plurality of I/O controllers; and
notify each I/O controller of the plurality of I/O controllers of a subset of the number of active streams that is assigned to that I/O controller.

20. The storage server of claim 19, wherein the second processing device is further to:
determine a hash function and one or more attributes that, when used together by a particular I/O controller of the plurality of I/O controllers, will produce a number of unique hash values that is equal to a number of streams in the subset of the number active streams that has been assigned to the particular I/O controller;
wherein to notify the particular I/O controller, the second processing device is to send to the particular I/O controller the hash function and an indication of the one or more attributes to use as inputs for the hash function.

* * * * *